United States Patent
Rumpf et al.

(10) Patent No.: US 10,432,891 B2
(45) Date of Patent: Oct. 1, 2019

(54) VEHICLE HEAD-UP DISPLAY SYSTEM

(71) Applicant: MAGNA ELECTRONICS INC., Auburn Hills, MI (US)

(72) Inventors: Horst H. Rumpf, Herborn (DE); Brian D. Brasier, Howell, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 183 days.

(21) Appl. No.: 15/617,217

(22) Filed: Jun. 8, 2017

(65) Prior Publication Data
US 2017/0359547 A1 Dec. 14, 2017

Related U.S. Application Data

(60) Provisional application No. 62/348,459, filed on Jun. 10, 2016.

(51) Int. Cl.
*H04N 5/72* (2006.01)
*G02B 27/01* (2006.01)

(52) U.S. Cl.
CPC ........... *H04N 5/72* (2013.01); *G02B 27/0101* (2013.01); *G02B 2027/012* (2013.01); *G02B 2027/0118* (2013.01); *G02B 2027/0138* (2013.01)

(58) Field of Classification Search
CPC .. H04N 5/72; H04N 5/23293; H04N 5/23238; H04N 5/2628; G02B 27/0101
USPC ....... 348/148, 143, 136, 118, 36, 37, 39, 47, 348/48, 49, 50, 837; 345/158, 87, 7, 8; 340/431, 432, 433, 434; 359/13, 30, 359/489.11
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,201,565 B1 | 3/2001 | Balogh | |
| 6,211,859 B1 * | 4/2001 | Lin | G06T 3/40 345/596 |
| 6,292,228 B1 * | 9/2001 | Cho | G09G 5/00 348/603 |
| 6,847,727 B1 * | 1/2005 | Hahn | B60R 1/00 345/690 |
| 6,999,071 B2 | 2/2006 | Balogh | |
| 7,855,755 B2 | 12/2010 | Weller et al. | |
| 8,427,751 B2 | 4/2013 | Rumpf et al. | |
| 8,521,411 B2 | 8/2013 | Grabowski et al. | |
| 8,953,247 B2 | 2/2015 | Rumpf et al. | |

(Continued)

FOREIGN PATENT DOCUMENTS

DE 102013206614 A1 10/2014

*Primary Examiner* — Jefferey F Harold
*Assistant Examiner* — Mustafizur Rahman
(74) *Attorney, Agent, or Firm* — Honigman LLP

(57) ABSTRACT

A display system for a vehicle includes a head-up display unit operable to display at a display area information that is viewable by a driver of the equipped vehicle when the driver is normally operating the equipped vehicle. When not displaying images at the display area but when the head-up display unit projects some light, there is a postcard effect at the display area. The head-up display unit includes a display screen and a compensation film that attenuates light passing through the display screen to reduce the postcard effect at the display area of the equipped vehicle.

19 Claims, 7 Drawing Sheets

(56) References Cited

U.S. PATENT DOCUMENTS

| | | |
|---|---|---|
| 9,405,120 B2 | 8/2016 | Graf et al. |
| 2002/0090767 A1* | 7/2002 | Bullock ............. G06Q 10/0631 |
| | | 438/151 |
| 2007/0024977 A1* | 2/2007 | Kawamura ........ G02B 19/0066 |
| | | 359/554 |
| 2008/0309860 A1* | 12/2008 | Nimura ................ G02B 5/3083 |
| | | 349/117 |
| 2012/0224060 A1* | 9/2012 | Gurevich .................. B60R 1/00 |
| | | 348/148 |
| 2013/0076787 A1* | 3/2013 | Mathieu .................... B60R 1/00 |
| | | 345/633 |
| 2013/0285885 A1 | 10/2013 | Nowatzyk et al. |
| 2014/0062946 A1 | 3/2014 | Graumann et al. |
| 2014/0063359 A1 | 3/2014 | Chen |
| 2014/0254013 A1* | 9/2014 | Lim ..................... G02B 5/3083 |
| | | 359/489.07 |
| 2014/0267585 A1* | 9/2014 | Chen .................. H04N 5/23238 |
| | | 348/36 |
| 2015/0092042 A1 | 4/2015 | Fursich |
| 2015/0232030 A1 | 8/2015 | Bongwald |
| 2015/0296135 A1 | 10/2015 | Wacquant et al. |
| 2015/0331235 A1* | 11/2015 | Dalmayrac ............ G02B 27/01 |
| | | 345/8 |
| 2016/0029111 A1 | 1/2016 | Wacquant et al. |
| 2016/0044284 A1 | 2/2016 | Goseberg et al. |
| 2016/0125631 A1* | 5/2016 | Ham .................. G02B 27/0179 |
| | | 345/633 |
| 2016/0137126 A1 | 5/2016 | Fursich et al. |
| 2016/0148062 A1 | 5/2016 | Fursich |
| 2016/0196098 A1* | 7/2016 | Roth ...................... B60K 35/00 |
| | | 715/761 |
| 2016/0209647 A1 | 7/2016 | Fursich |
| 2017/0153457 A1 | 6/2017 | Kunze |
| 2017/0161949 A1* | 6/2017 | Seder ...................... G06F 3/011 |
| 2018/0339591 A1* | 11/2018 | Suzuki .................. B60K 35/00 |

\* cited by examiner

VEHICLE HEAD-UP DISPLAY SYSTEM

CROSS REFERENCE TO RELATED APPLICATION

The present application claims the filing benefits of U.S. provisional application Ser. No. 62/348,459, filed Jun. 10, 2016, which is hereby incorporated herein by reference in its entirety.

FIELD OF THE INVENTION

The present invention relates generally to a vehicle vision system for a vehicle and, more particularly, to a vehicle vision system that includes a display for displaying information to an occupant of a vehicle.

BACKGROUND OF THE INVENTION

Use of imaging sensors in vehicle imaging systems is common and known. Examples of such known systems are described in U.S. Pat. Nos. 5,949,331; 5,670,935 and/or U.S. Pat. No. 5,550,677, which are hereby incorporated herein by reference in their entireties. Head-up displays are also known and may display video images or other information for viewing by the driver of the vehicle. Examples of known head-up displays are described in U.S. Publication No. US-2014-0063359 and DE Publication No. DE 10 2013 206 614, which are hereby incorporated herein by reference in their entireties.

SUMMARY OF THE INVENTION

The present invention provides a display system or vision system or imaging system for a vehicle that includes a head-up display for displaying information to an occupant of a vehicle. The head-up display or monitor may be a component of a camera monitoring system (such as central review mirror replacement or side mirror replacement, surround and top view vision system or rear panorama vision system), or a component of a navigation system or infotainment system, or a component of an instrument and driving aid augmentation or the like. The head-up display unit comprises a display screen that is backlit by a light source and projects or displays information or video images for viewing by the driver or occupant of the vehicle, such as by the driver or occupant viewing towards and through the windshield of the vehicle or viewing a combiner at the dashboard of the vehicle or the like. The head-up display unit comprises a compensation film that is disposed in an optic path of the display (between the display screen and the display area) and that attenuates light passing through the display to reduce the actual and perceived postcard effect at the display area of the equipped vehicle.

These and other objects, advantages, purposes and features of the present invention will become apparent upon review of the following specification in conjunction with the drawings.

DESCRIPTION OF THE PREFERRED EMBODIMENTS

There are different tasks and locations for monitors in a vehicle—monitors typically located at the dashboard, head unit or in the front seat's head rests are often used as infotainment displays, while monitors disposed at the windshield are often used as aftermarket navigation screens. OEM navigation system's monitors are often integrated into the head unit in the lower center, or on top of the dash board in the center. Head-up display systems may show navigation system information as well as forward vision driving warning and aiding information. There are some approaches to show forward vision scene augmentation. Vehicle cluster instruments are often done in augmented vision on displays. These displays may show different data individually when required. Vehicle camera vision often uses existing monitors or projectors for displaying camera images and overlays such as rear view camera and top view displaying as well as curb view and cross traffic view. Other applications require extra monitors or displays such as central rear view mirror replacing camera monitor systems or side mirror replacing rear and blind spot camera displays, such as by utilizing aspects of the systems described in International Publication No. WO 2014/204794, which is hereby incorporated herein by reference in its entirety.

Figure 1:
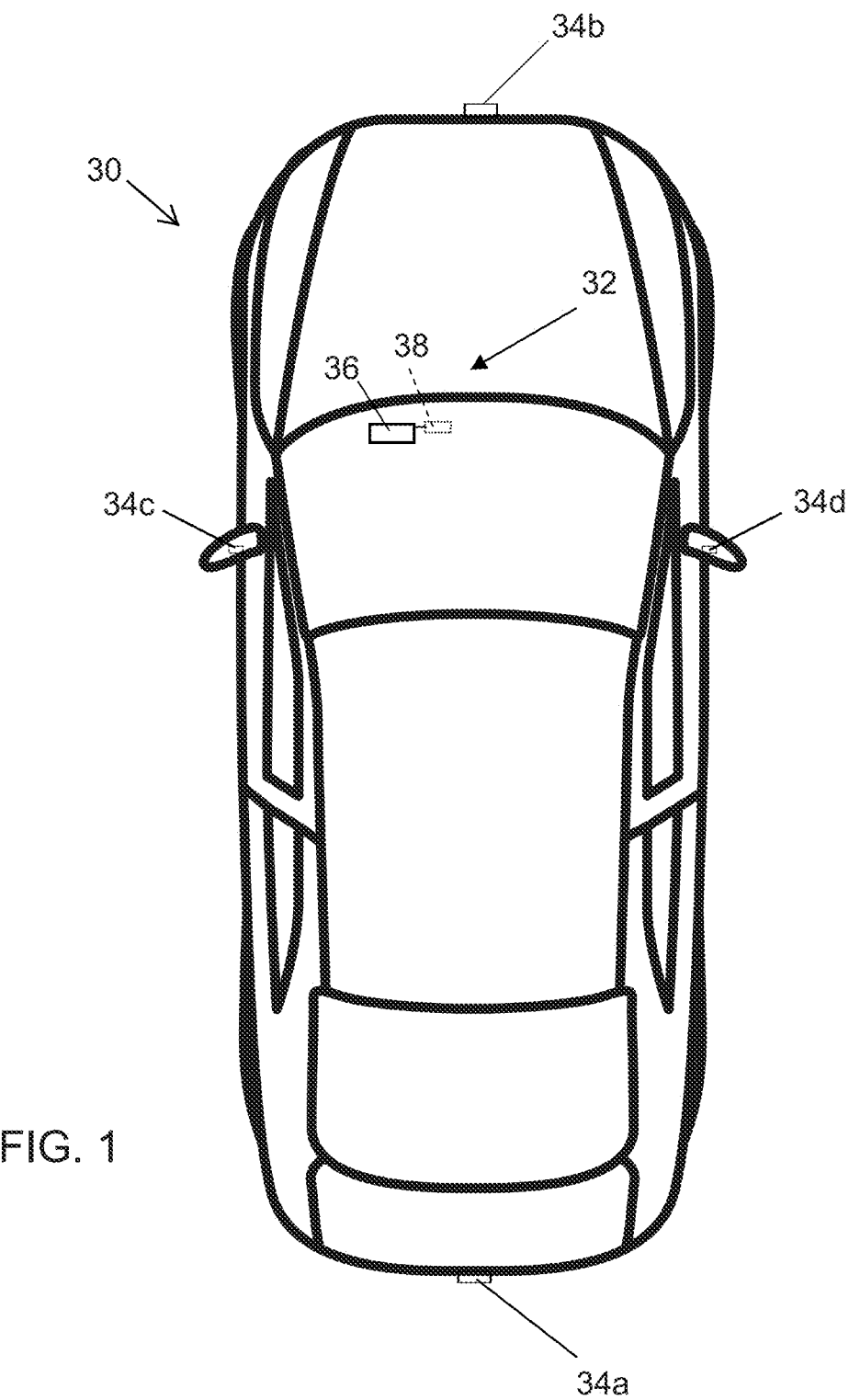
FIG. 1 is a plan view of a vehicle with a vision system that incorporates cameras and a head up display (HUD) unit in accordance with the present invention.

Referring now to the drawings and the illustrative embodiments depicted therein, a vehicle 30 includes an imaging system or vision system or display system 32 that includes a display device 36 and optionally at least one exterior facing imaging sensor or camera, such as a rearward facing imaging sensor or camera 34a (and the system may optionally include multiple exterior facing imaging sensors or cameras, such as a forward facing camera 34b at the front (or at the windshield) of the vehicle, and a sideward/rearward facing camera 34c, 34d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like).

The vision system 32 includes a control or electronic control unit (ECU) or processor 38 that is operable to process image data captured by the camera or cameras and may detect objects or the like and/or provide displayed images at the display device 36 for viewing by the driver of the vehicle. The display device 36 comprises a head up display device that is operable to project images for viewing by the driver of the vehicle during normal operation of the vehicle, as discussed below. The data transfer or signal communication from the camera to the ECU may comprise any suitable data or communication link, such as a vehicle network bus or the like of the equipped vehicle.

The head up display device or unit 36 may include a folding mirror, a display screen (such as a thin film transistor (TFT) backlit display screen or the like) and a cooling device. The folding mirror may be adjustably positioned and adjusted to adjust an optical path between the display screen and the driver's eyes, such as by utilizing aspects of the display systems described in U.S. Publication No. US-2017-0153457, which is hereby incorporated herein by reference in its entirety.

Figure 2:
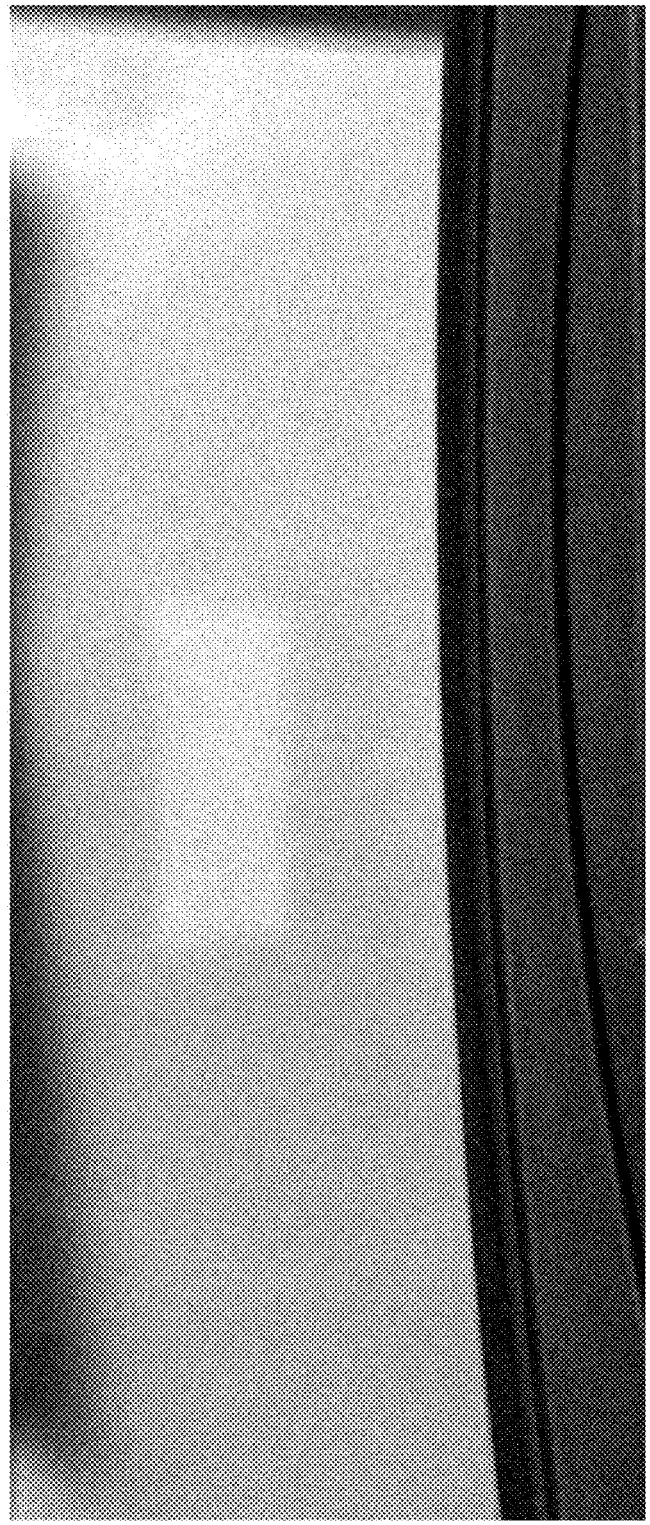
FIG. 2 is a view of a windshield HUD with an image reflection of a display which has a rest of glowing, even tune to 'no image' displaying.
Figure 3A:
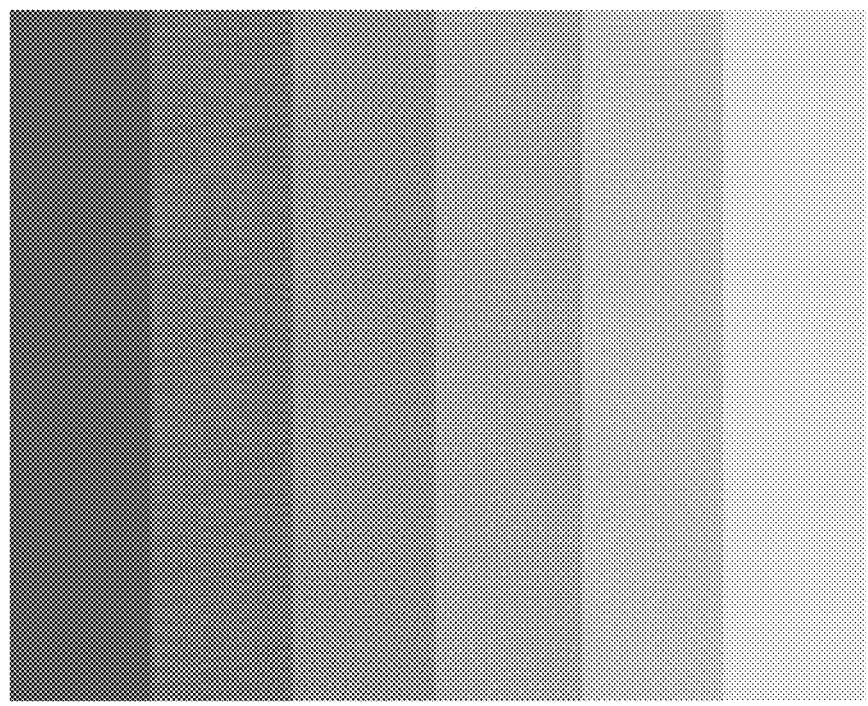
FIG. 3A shows Mach bands, which are an optical illusion named after the physicist Ernst Mach, with this illusion exaggerating the contrast between edges of neighboring shades of gray by triggering edge-detection in the human visual system.
Figure 3B:
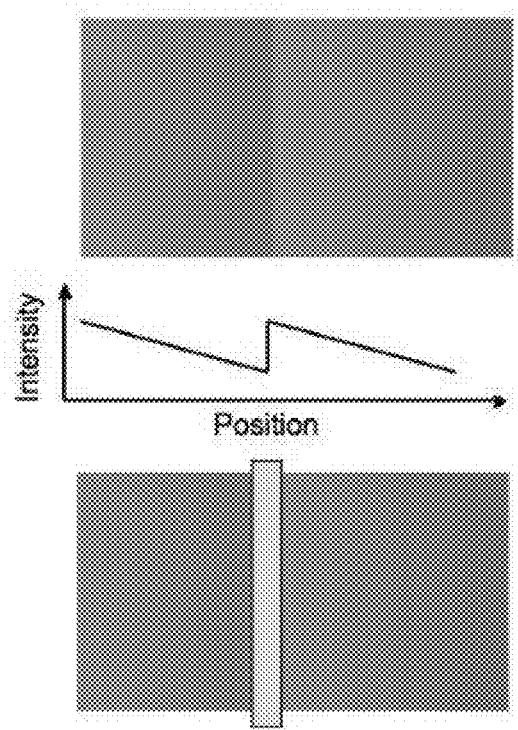
FIG. 3B explains the Craik O'Brien Cornsweet Illusion, which shows how the contrast ratio is exaggerated by neurons in our eyes and how our compensation filter (such as, for example, light blue) makes the "darkness difference" (post card effect) go away.
Figure 4A:
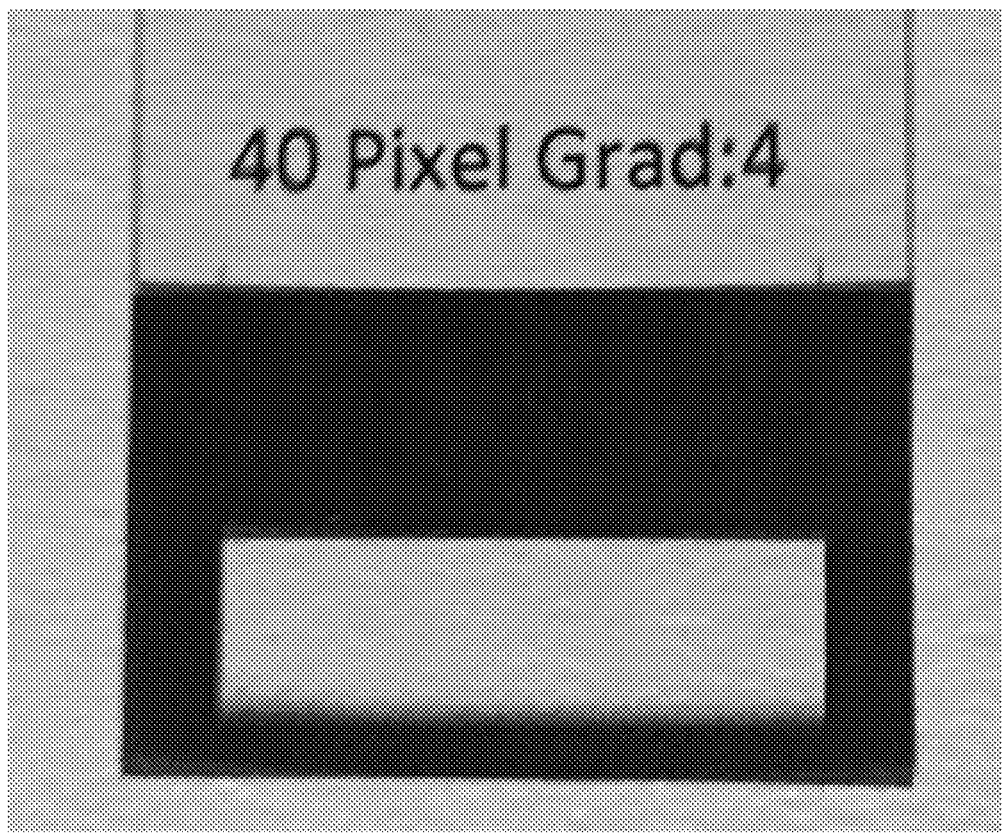
FIG. 4A shows the sharp transition between the dark grey display area and black surround of a HUD, called the "postcard effect", which is an example of Mach banding, shown with a filter that diffuses the transition region and reduces the perception of postcarding.
Figure 4B:
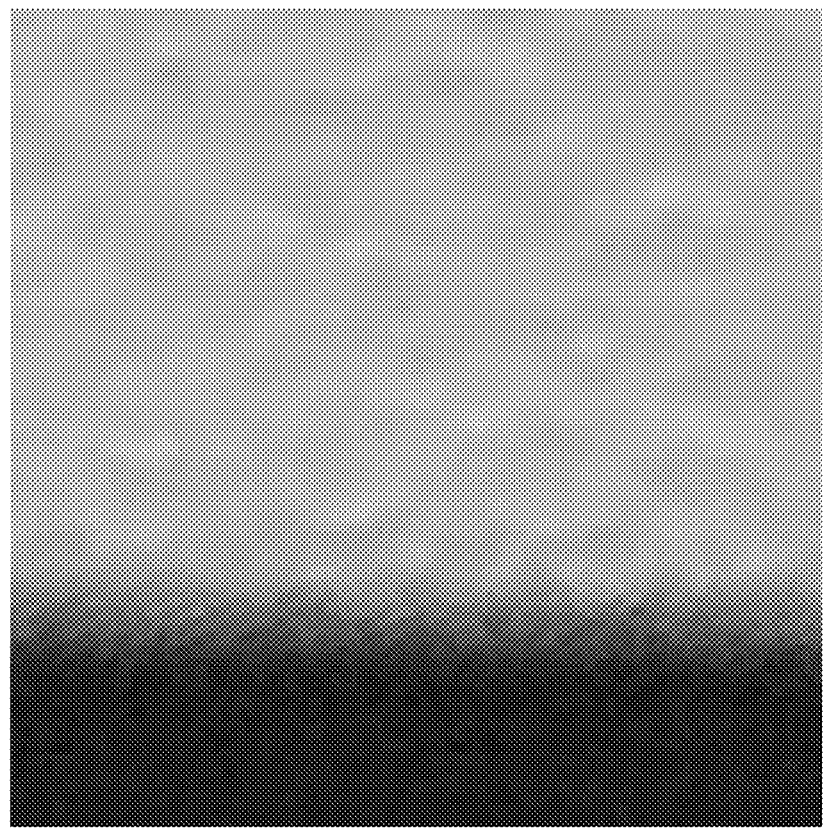
FIG. 4B is a close up of a Mach banding region of FIG. 4A.
Figure 5:
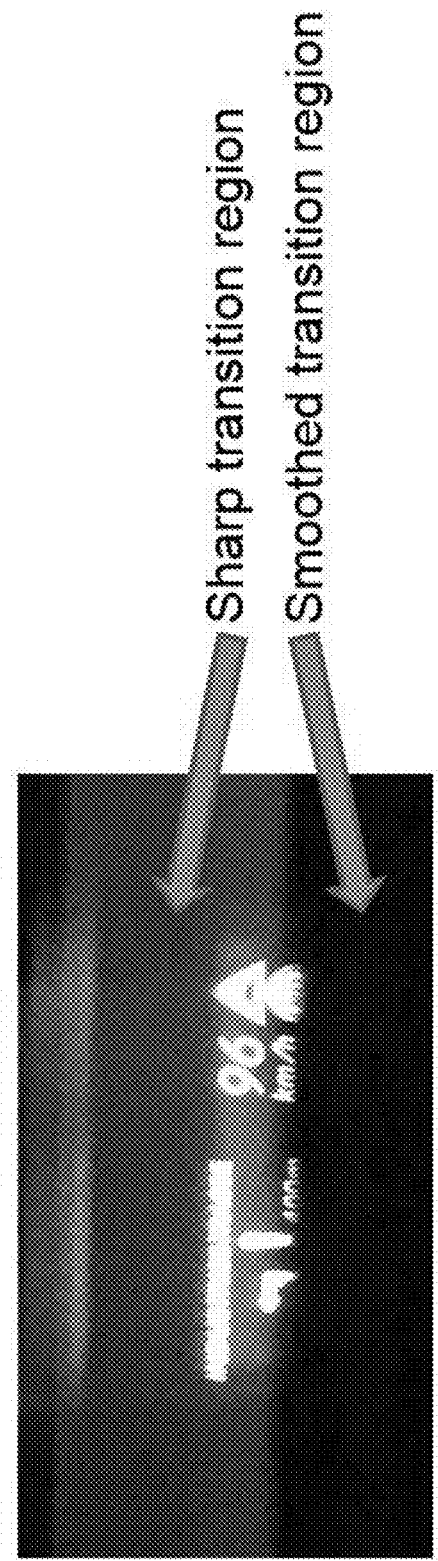
FIG. 5 shows the difference between a sharp transition region and a smoothed transition region by using March banding done by using a compensation film in accordance with the present invention.

In general, light leaks through a TFT display even when it is set to black. In other words, a display that is showing no symbol (fully black) only blocks about 99 percent of the light trying to get through. The light that sneaks thru creates a soft "glow" that is undesirable. That also appears on Head Up Displays (HUD), where the illuminated or displayed area is visible as a reflection on the windshield or the combiner, depending on the HUD type (see FIG. 2). There the image has a contrast against the outside background which potentially very dark or black at nighttime. The glow is most pronounced around the edges, and is more noticeable at night.

In many automotive displays, an LED or light bulb is used to backlight a printed plastic film (such as, for example, instrument clusters). The light sources will create "hot spots" on the printed plastic film closest to the light. To offset the bright spots, the plastic film receives additional printing to selectively block light at the "hot" areas. This "light compensation" intensity can be varied infinitely over the printed plastic film surface.

The present invention provides a means for reducing the postcard effect by using a compensation film. The postcard effect is most noticeable around the perimeter of the display because the edge goes sharply from "glow" to black (where light is absolutely blocked by the plastic or metal TFT frame). The display system of the present invention uses a compensation film in the optic path to "soften" the sharp transition between the "glow" region and the black region. The use of a compensation film selectively blocks light passing through the display to reduce the actual and perceived postcard effect.

The compensation film is not provided to improve the display's contrast ratio. Instead, the film functions to reduce the postcard effect. Without a sharp line between dark grey and black to excite edge detecting neurons in the human eye, the human eye will perceive the display's postcard effect to be about the same as the postcard effect of an expensive display. For example, a display having about a 500:1 contrast ratio with a filter in accordance with the present invention may provide a similar perceived postcard effect as a display having a 1000:1 contrast ratio.

Therefore, the display system of the present invention provides a head up display that includes a compensation film disposed along the optic path of the display system, whereby, when the display is deactivated (and may have a glow that is visible at the windshield), the film diffuses the edges of the display region to reduce or dissipate the sharp line between dark grey (where the display area is located) and black (the area around the display area), so that the glow is not readily visible to and discernible by a person viewing the display area at the windshield of the vehicle. The display system thus provides an enhanced appearance of the windshield and display area when the display is deactivated and does so at a reduced cost as compared to other display systems.

The display system of the present invention may utilize aspects of the display systems described in U.S. Pat. Nos. 9,405,120; 8,953,247; 8,427,751 and/or U.S. Pat. No. 7,855,755, and/or International Publication No. WO 1998/034411; WO 2001/088598; WO 2013/162977 and/or WO 2005/121707 and/or U.S. Publication Nos. US-2017-0153457; US-2016-0209647; US-2015-0092042; US-2015-0232030 and/or US-2015-0296135, which are hereby incorporated herein by reference in their entireties.

Optionally, the head-up display may display a seamless side-rear view panorama image generated (in real time) by morphing and stitching images from the vehicle side cameras and images from the vehicle rear camera, where the rear vision may be produced in 2D or 3D by multiple cameras utilizing aspects of the systems described in U.S. Publication Nos. US-2016-0148062; US-2016-0044284 and/or US-2015-0232030, which are is hereby incorporated herein by reference in their entireties. Optionally, the acoustics virtual source may also be controlled to follow simultaneously with the image presented by the individual light field monitor to the individual passenger such as by utilizing aspects of the systems described in U.S. Publication No. US-2016-0029111, which is hereby incorporated herein by reference in its entirety. Optionally, a side camera's combined rear and blind spot view, such as by utilizing aspects of the systems described in the above incorporated International Publication No. WO 2014/204794, which is hereby incorporated herein by reference in its entirety, may be displayed.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or U.S. Pat. No. 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 6,882,287; 5,929,786 and/or U.S. Pat. No. 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, the video display may utilize aspects of the display devices described in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or U.S. Pat. No. 6,690,268, and/or in U.S. Publication Nos. US-2006-0061008 and/or US-2006-0050018, which are all hereby incorporated herein by reference in their entireties. The display may be disposed behind a mirror reflective element so as to be viewable through the reflective element when the display is activated to display information. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or U.S. Pat. No. 7,274,501, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A display system for a vehicle, said display system comprising:
   a head-up display unit disposed in a vehicle and operable to display information at a display area that is viewable by a driver of the vehicle when the driver is normally operating the vehicle;
   wherein, when not displaying information at the display area but when said head-up display unit projects some light, there is a postcard effect at the display area;
   wherein said head-up display unit comprises a display screen and projects light through said display screen for displaying information at the display area, and wherein said head-up display unit comprises a compensation film that attenuates light passing through said display screen to reduce the postcard effect at the display area of the vehicle; and
   wherein, when said head-up display unit is deactivated and has a glow that is visible at the windshield, said compensation film diffuses edges of the display area to reduce sharp lines between dark grey, where the display area is located, and black, at areas surrounding the display area, so that the glow is not readily visible to and discernible by a person viewing the display area.

2. The display system of claim 1, wherein said display screen comprises a thin film transistor display screen backlit by at least one light source.

3. The display system of claim 2, wherein said at least one light source comprises at least one light emitting diode.

4. The display system of claim 1, wherein said compensation film is disposed in the optic path between said display screen and the display area to soften the sharp transition between a glow region and a black region.

5. The display system of claim 1, wherein said compensation film selectively blocks light passing through said display screen to reduce the actual and perceived postcard effect.

6. The display system of claim 1, wherein the display area is at a windshield of the vehicle, and wherein said head-up display unit is disposed at or in the instrumental panel and projects images toward the display area at the windshield of the vehicle.

7. The display system of claim 1, wherein the display area is at a combiner on top of a dashboard of the vehicle and facing the driver of the vehicle, and wherein said head-up display unit is disposed at or in the instrumental panel and projects images onto the combiner on top of the dashboard of the vehicle and facing the driver of the vehicle.

8. The display system of claim 1, comprising at least one camera disposed at the vehicle so as to have a respective field of view exterior of the vehicle, and wherein said head-up display unit is operable to display images derived from image data captured by said at least one camera.

9. A display system for a vehicle, said display system comprising:
   a head-up display unit disposed in a vehicle and operable to display information at a display area that is viewable by a driver of the vehicle when the driver is normally operating the vehicle;
   wherein the display area is at a windshield of the vehicle and wherein said head-up display unit is disposed at or in the instrumental panel and projects images toward the display area at the windshield of the vehicle;
   wherein, when not displaying information at the display area but when said head-up display unit projects some light, there is a postcard effect at the display area;
   wherein said head-up display unit comprises a display screen and projects light through said display screen for displaying information at the display area, and wherein said head-up display unit comprises a compensation film that attenuates light passing through said display screen to reduce the postcard effect at the display area of the vehicle; and
   wherein said compensation film is disposed in the optic path between said display screen and the display area to soften the sharp transition between a glow region and a black region.

10. The display system of claim 9, wherein said display screen comprises a thin film transistor display screen backlit by at least one light emitting diode.

11. The display system of claim 9, wherein said compensation film selectively blocks light passing through said display screen to reduce the actual and perceived postcard effect.

12. The display system of claim 9, wherein, when said head-up display unit is deactivated and has a glow that is visible at the windshield, said compensation film diffuses edges of the display area to reduce sharp lines between dark grey, where the display area is located, and black, at areas surrounding the display area, so that the glow is not readily visible to and discernible by a person viewing the display area.

13. The display system of claim 9, comprising at least one camera disposed at the vehicle so as to have a respective field of view exterior of the vehicle, and wherein said head-up display unit is operable to display images derived from image data captured by said at least one camera.

14. A display system for a vehicle, said display system comprising:
- a head-up display unit disposed in a vehicle and operable to display information at a display area that is viewable by a driver of the vehicle when the driver is normally operating the vehicle;
- wherein the display area is at one selected from the group consisting of (i) a windshield of the vehicle and (ii) a combiner on top of a dashboard of the vehicle and facing the driver of the vehicle, and wherein said head-up display unit is disposed at or in the instrumental panel;
- wherein, when not displaying information at the display area but when said head-up display unit projects some light, there is a postcard effect at the display area;
- wherein said head-up display unit comprises a display screen and projects light through said display screen for displaying information at the display area, and wherein said head-up display unit comprises a compensation film that attenuates light passing through said display screen to reduce the postcard effect at the display area of the vehicle; and
- wherein, when said head-up display unit is deactivated and has a glow that is visible at the windshield, said compensation film diffuses edges of the display area to reduce sharp lines between dark grey, where the display area is located, and black, at areas surrounding the display area, so that the glow is not readily visible to and discernible by a person viewing the display area.

15. The display system of claim 14, wherein said display screen comprises a thin film transistor display screen backlit by at least one light emitting diode.

16. The display system of claim 14, wherein said compensation film selectively blocks light passing through said display screen to reduce the actual and perceived postcard effect.

17. The display system of claim 14, wherein the display area is at a windshield of the vehicle, and wherein said head-up display unit is disposed at or in the instrumental panel and projects images toward the display area at the windshield of the vehicle.

18. The display system of claim 14, wherein the display area is at a combiner on top of a dashboard of the vehicle and facing the driver of the vehicle, and wherein said head-up display unit is disposed at or in the instrumental panel and projects images onto the combiner on top of the dashboard of the vehicle and facing the driver of the vehicle.

19. The display system of claim 14, comprising at least one camera disposed at the vehicle so as to have a respective field of view exterior of the vehicle, and wherein said head-up display unit is operable to display images derived from image data captured by said at least one camera.

* * * * *